US006859190B2

(12) United States Patent
Pillai et al.

(10) Patent No.: US 6,859,190 B2
(45) Date of Patent: Feb. 22, 2005

(54) RFID TAG WITH A QUADRUPLER OR N-TUPLER CIRCUIT FOR EFFICIENT RF TO DC CONVERSION

(75) Inventors: Vijay Pillai, Shoreline, WA (US); Harley Kent Heinrich, Everett, WA (US); Rene D. Martinez, Seattle, WA (US)

(73) Assignee: Intermec IP Corp, Everett, WA (US)

( * ) Notice: Subject to any disclaimer, the term of this patent is extended or adjusted under 35 U.S.C. 154(b) by 96 days.

(21) Appl. No.: 10/455,757

(22) Filed: Jun. 4, 2003

(65) Prior Publication Data

US 2003/0222763 A1 Dec. 4, 2003

Related U.S. Application Data

(60) Provisional application No. 60/385,528, filed on Jun. 4, 2002, and provisional application No. 60/430,553, filed on Dec. 3, 2002.

(51) Int. Cl.$^7$ .............................. G08B 13/14; H04Q 1/00
(52) U.S. Cl. .................................. 343/860; 340/572.4
(58) Field of Search ............................ 343/860, 895, 343/866, 867, 742; 340/572.4, 572.5, 572.7; 342/42, 44

(56) References Cited

U.S. PATENT DOCUMENTS

| | | | | |
|---|---|---|---|---|
| 6,011,488 A | * | 1/2000 | Busser | 340/10.34 |
| 6,140,924 A | * | 10/2000 | Chia et al. | 340/572.5 |
| 6,400,274 B1 | * | 6/2002 | Duan et al. | 340/572.7 |
| 6,738,025 B2 | * | 5/2004 | Carrender | 343/860 |

\* cited by examiner

*Primary Examiner*—Michael C. Wimer
(74) *Attorney, Agent, or Firm*—Rodney T Hodgson

(57) ABSTRACT

A multistage voltage multiplying circuit for single chip passive RF tags is provided, wherein the parasitic capacitance of the diodes of each stage of the voltage multiplying circuit is much less than the parasitic capacitance of the diodes of the preceding stage.

5 Claims, 3 Drawing Sheets

RFID TAG WITH A QUADRUPLER OR N-TUPLER CIRCUIT FOR EFFICIENT RF TO DC CONVERSION

CROSS REFERENCE TO RELATED APPLICATIONS

The present application claims benefit from provisional U.S. application 60/430,553 entitled RFID Tag with a quadrupler or N-tupler circuit for efficient RF to DC conversion Inventors Vijay Pillai, Harley Kent Heinrich, Rene D. Martinez filed Dec. 3, 2002. The present application claims benefit from provisional U.S. application 60/385,528 filed Jun. 4, 2002. All of the above identified patents and patent applications are hereby incorporated herein by reference in their entirety including incorporated material.

FIELD OF THE INVENTION

The field of the invention is the field of passive radio frequency (RF) transponders (Tags).

BACKGROUND OF THE INVENTION

Batteryless remotely powered devices, such as RF identification transponders (RFID tags), are well known in the industry. These devices employ coils or RF antennas to couple to a fixed or handheld base station transmitter which sends out power and/or signals as electromagnetic waves. Such devices use an AC power circuit that converts the AC power received by the antenna to a DC voltage level. The DC power is then used to power the circuit or circuits in the remotely powered device. In order for the devices in the circuits to work, the DC voltage level generated by the AC power circuit must be above a certain minimum level. To extend the range of these devices, the antenna or coil is resonant with the electromagnetic field, and the front-end circuits are typically resonant with the AC coil or RF antenna. Historically, these front-end circuits are simply diode rectifiers, full-wave rectifiers, or voltage doubling circuits.

Voltage multiplier circuits with multiplication of greater than two are well-known in the art of digital circuits. Such circuits have been proposed, but have not been used in to provide voltage multiplication in remotely powered devices such as RFID tags operated at high frequencies above 2 Ghz.

PATENTS AND APPLICATIONS ASSIGNED TO THE ASSIGNEE OF THE PRESENT APPLICATION

U.S. application Ser. No. 10/308,859 filed Dec. 3, 2002; Ser. No. 10/162,418 filed Jun. 4, 2002; Ser. No. 09/321,986 filed May 28, 1999; Ser. No. 09/227,768 filed Jan. 9, 1999; Ser. No. 08/733,684 filed Oct. 17, 1996; Ser. No. 08/521,898 filed Aug. 31, 1995, now U.S. Pat. No. 5,606,323 issued Feb. 25, 1997; Ser. No. 09/114,037 filed Jul. 10, 1998; Ser. No. 09/195,733 filed Jan. 19, 1998; Ser. No. 09/211,584 filed Dec. 14, 1998; Ser. No. 08/626,820 filed Apr. 3, 1996, now U.S. Pat. No. 5,850,181; Ser. No. 09/263,057 filed Mar. 6, 1999; 60/077,094 filed Mar. 6, 1998; Ser. No. 09/266,973 filed Mar. 12, 1999; 60/077,872 filed Mar. 13, 1998; Ser. No. 09/922,598 filed Dec. 29, 1998; 60/070,347 filed Jan. 2, 1998; 60/385,528 filed Jun. 4, 2002 entitled RFID Tag with a quadrupler or N-tupler circuit for efficient RF to DC conversion, by Vijay Pillai, Harley Kent Heinrich, Rene D. Martinez, Ser. No. 60/385,528, U.S. Provisional application Ser. No. 60/430,553 filed Dec. 3, 2002 entitled RFID Tag with a quadrupler or N-tupler circuit for efficient RF to DC conversion, by Harley Kent Heinrich; and U.S. Pat. Nos. 6,400,274, 6,243,013, 6,028,564, 6,097,347, 5,808,550 and 5,606,323 are each incorporated herein by reference in its entirety. All of the above identified patents and patent applications are hereby incorporated herein by reference in their entirety including incorporated material.

OBJECTS OF THE INVENTION

It is an object of the invention to produce passive RF tags with power supplies which produce more voltage than is available from a simple voltage doubling circuit.

It is an object of the invention to produce passive RF tags with power supplies having multiple stages of voltage addition.

SUMMARY OF THE INVENTION

A cascaded voltage multiplier circuit for a passive (no battery) RFID tag constructed from an antenna connected to a single semiconductor chip. The present invention shows that the parasitic capacitance of each stage in the cascaded voltage multiplier circuit must be smaller than the parasitic capacitance of the preceding stage, under the constraint that the RF impedance of the diodes of each stage must be much less than the RF impedance of the coupling capacitor of each stage.

DETAILED DESCRIPTION OF THE INVENTION

The present inventors have constructed RF tags which solely of a single semiconductor chip attached to an antenna. The range of such tags is determined essentially by the voltage which can be produced on the chip. However, attempts to produce tags with prior art voltage multiplying circuits failed to produce expected tag voltages when the tags were used for RF tags in the 2.4 GHz frequency region. The present invention recognizes that the failure of voltage quadrupler and voltage sextupler circuits to give higher voltage than simple voltage doubler circuits in RF tags is due to the effect of the voltage multiplication circuit on the performance of the tag resonant circuit.

The present disclosure describes how these voltage multiplication circuits can be used with a resonant AC/RF front-end to increase the resultant DC voltage level from the AC-DC conversion circuit.

This invention disclosure describes resonant AC-DC voltage multiplier circuits that extend the range performance of batteryless remotely powered devices such as RFID tags. This technology will increase the range performance of the devices.

Figure 1:
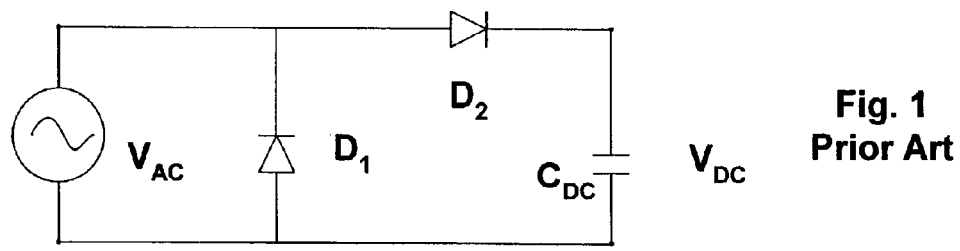
FIG. 1 shows the circuit diagram of a prior art voltage doubling circuit.

FIG. 1 shows a diagram of a single stage prior art voltage doubling circuit which works well in present RF tags. The peak to peak AC voltage received from the antenna is represented by $V_{AC}$. Diodes $D_1$ and $D_2$ act to charge capacitor $C_{DC}$ to a DC voltage $V_{DC}$ approximately twice the peak to peak voltage of $V_{AC}$. Diodes $D_1$ and $D_2$ are preferably CMOS diodes, and may be formed on a silicon, silicon-germanium, or gallium arsenide substrate, or indeed on any semiconductor substrate suitable for the construction of the components necessary for the RF tag to function. More preferably, diodes $D_1$ and $D_2$ are Schottky diodes which are faster and have less forward voltage drop than normal diodes used in semiconductor technology. The DC voltage available from such a circuit is given by $$V_{DC} = 2(V_{AC} - V_{Schottky})$$

where $V_{Shottky}$ is the forward voltage drop across the Schottky diodes $D_1$ and $D_2$.

Many different circuits with more diodes may be used in place of the circuit of FIG. 1 to give a DC voltage greater than AC peak to peak voltage at the antenna terminals. The inventors anticipate that the teaching of this disclosure may be used with all such circuits to achieve the objects of the present invention.

Figure 2:
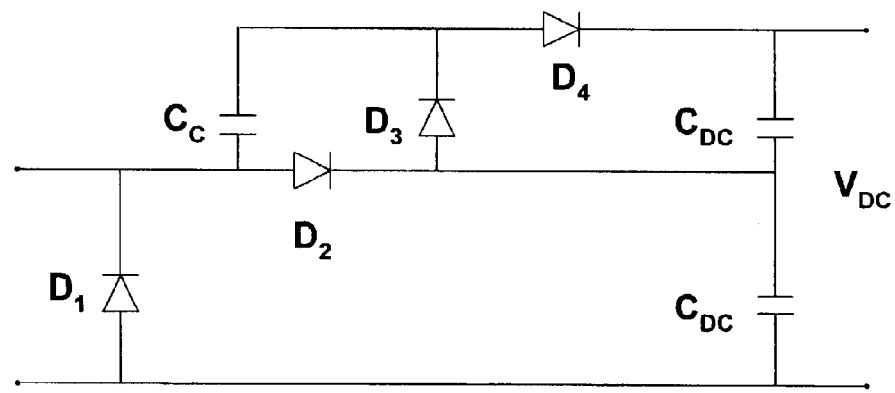
FIG. 2 shows the circuit diagram of a prior art voltage quadrupling circuit.

FIG. 2 shows a diagram of a prior art two stage voltage quadrupling circuit for a digital circuit having discrete devices. The inventors have heretofore constructed RF tags having such a circuit, but have been unsuccessful in producing a higher voltage from such a circuit than that available from a simple voltage doubling circuit such as FIG. 1.

Figure 3:
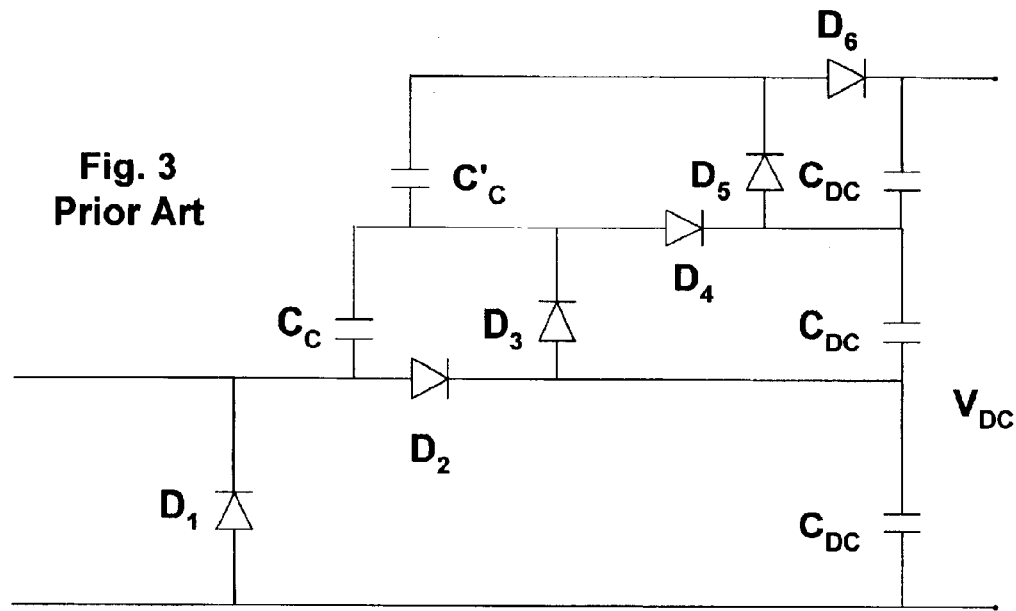
FIG. 3 shows the circuit diagram of a prior art voltage sextupling circuit.

FIG. 3 shows a diagram of a prior art three stage voltage sextupling circuit for a digital circuit having discrete devices.

Figure 4:
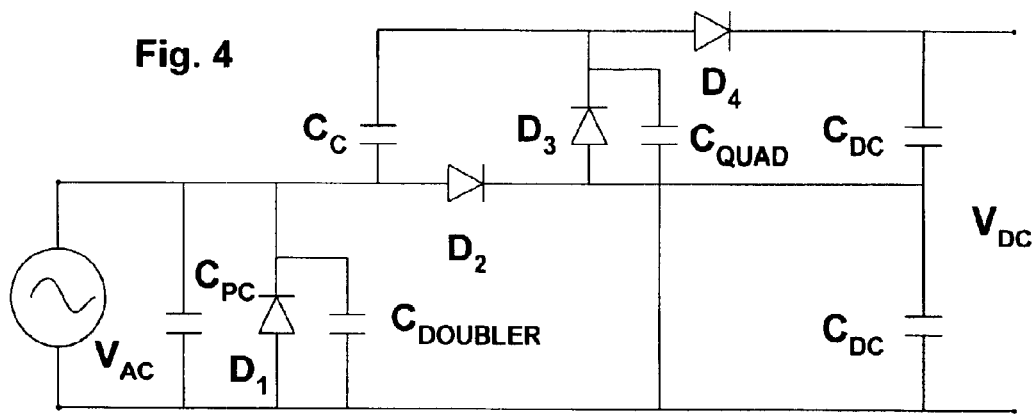
FIG. 4 shows the circuit diagram of a two stage voltage multiplying circuit of the present invention.

FIG. 4 shows the circuit diagram for a two stage voltage (4×) multiplier (quadrupler) with the associated parasitics. The circuit of FIG. 4 resembles the circuit of FIG. 2 with two stages of voltage multiplication. However, when the circuit of FIG. 2 is used in a resonant circuit as the resonating element—i.e. the parasitics of the circuit provide the matching resonant components to antenna inductance or coil inductance—the parasitic components must be taken into account. The DC voltage $V_{DC}$ developed by the circuit of FIG. 4 from an RF signal voltage $V_{RF}$ at the input will be given by $$V_{DC} = 4(V_{RF} - V_{Schottk}) \frac{C_{Doubler}}{(C_{Doubler} + C_{Quad} + C_{PC})}$$

where $V_{RF}$ is the peak to peak amplitude of the RF signal at the input to the circuit, $V_{Schottky}$ is the forward voltage drop across the Schottky diodes used in the multiplier circuit, $C_{Doubler}$ is the parasitic capacitance of the diodes $D_1$ and $D_2$ of the diode voltage doubler stage, $C_{Quad}$ is the parasitic capacitance of the 2 extra diodes $D_3$ and $D_4$ in the second stage (voltage quadrupling) of the voltage multiplying circuit, and $C_{PC}$ is the parasitic capacitance of the AC coupling capacitor $C_C$. In order for the circuit of FIG. 4 to work, the coupling capacitance, $C_C$ must be a high-quality RF capacitor with low parasitic capacitance $C_{PC}$ and a low series resistance. From the above equation, if the doubler and quadrupler parasitic capacitances $C_{Doubler}$ and $C_{Quad}$ are equal, and the parasitics $C_{PC}$ of the coupling capacitor were zero, the quadrupler would provide the same DC voltage as that of a doubler alone $$V_{DC} = 2(V_{RF} - V_{Schottky}).$$

The present inventors first attempts at such voltage multiplication circuits in fact used Schottky diodes which all had the same parasitic capacitance, and hence no effect on range was seen.

The inventors realized that the circuit diagram to be used was indeed the diagram of FIG. 4, and that additional voltage multiplication can be achieved if $$C_{QUAD} + C_{PC} << C_{DOUBLER}.$$

Since the parasitic capacitances of the devices on the chip is generally proportional to the area of the diodes, this condition can be met if the diodes $D_3$ and $D_4$ in the quadrupler stage are smaller that those diodes $D_1$ and $D_2$ in the doubler stage, and if we make the coupling capacitor parasitic capacitance small. Unfortunately, as we make the coupling capacitor smaller and smaller, a large portion of the AC front-end voltage appears across the coupling capacitor rather than across the upper diode quadrupler. Therefore, this condition of the above equation must also be constrained by the requirement that $$Z_C << Z_{QUAD},$$

or the RF impedance $Z_C$ of the coupling capacitor must be small compared the RF impedance $Z_{Quad}$ of the diodes in the quadrupler, $D_3$ and $D_4$.

Figure 5:
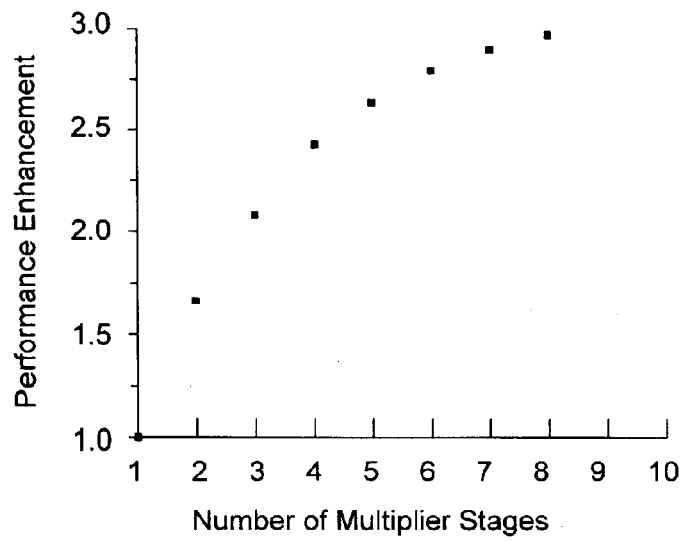
FIG. 5 shows the voltage multiplier performance enhancement over a simple diode doubler circuit as a function of the number of multiplier stages of the present invention.

Unfortunately, in the real world, all of these conflicting conditions cannot be met simultaneously, and as a result, the performance of the quadrupler does not provide twice the performance of the diode doubler. However, by optimizing the diode sizes in the voltage quadrupler stage and the coupling capacitor size, we can gain a significant improvement in the range performance of the device. FIG. 5 shows typical results of this optimization for a high-performance (0.35 micron CMOS) IC process. Parasitics of the various devices on the chip may be calculated by one skilled in the art for such a process. In the example shown in FIG. 5, the diodes $D_3$ and $D_4$ in the voltage quadruplet stage have 25% of the area of the diodes $D_1$ and $D_2$ of the voltage doubler stage. Preferably, the parasitic capacitance $C_{QUAD}$ of the second stage diodes $D_3$ and $D_4$ should be less than 80% of the parasitic capacitance $C_{DOUBLER}$ of the first stage diodes $D_1$ and $D_2$. More preferably, the parasitic capacitance $C_{QUAD}$ of the second stage diodes $D_3$ and $D_4$ should be less than 50% of the parasitic capacitance $C_{DOUBLER}$ of the first stage diodes $D_1$ and $D_2$. Most preferably, the parasitic capacitance $C_{QUAD}$ of the second stage diodes $D_3$ and $D_4$ should be less than 30% of the parasitic capacitance $C_{DOUBLER}$ of the first stage diodes $D_1$ and $D_2$.

Notice that for a quadrupler circuit, number of multiplier stages=2, the performance enhancement can be over a factor of 1.6 over that of a simple voltage doubler. As the number of multiplier stages is increased, the performance benefit from adding additional stages diminishes. In general, for narrower linewidth IC processes, the associated device parasitics goes down, and the maximum overall performance that can be achieved from using a large number of multiplier stages will improve over that shown in FIG. 5. Such improvements are anticipated by the inventors as linewidth ground rules on chips are continually reduced.

Figure 6:
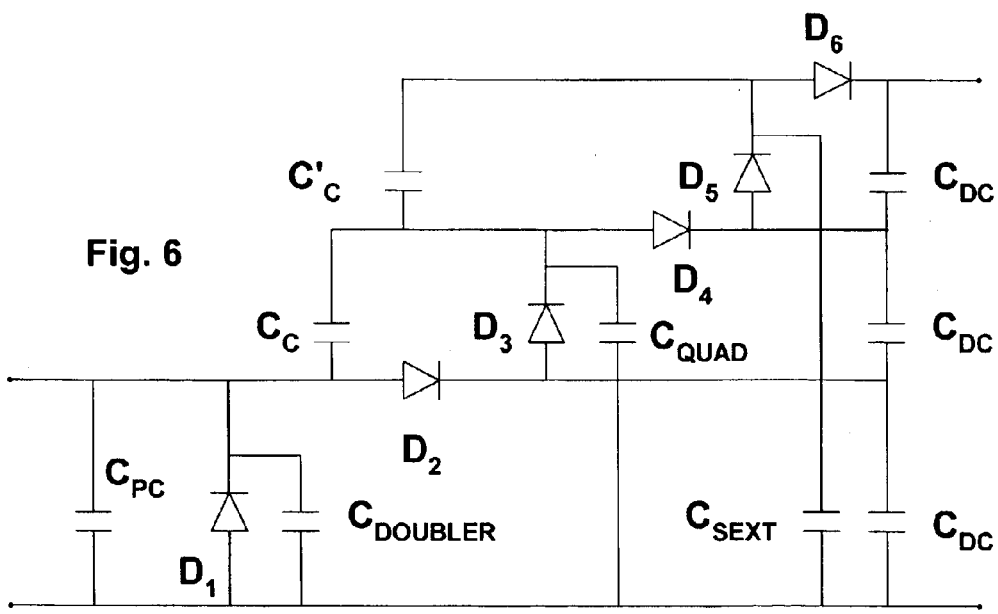
FIG. 6 shows the circuit diagram of a three stage voltage multiplying circuit of the present invention.

FIG. 6 shows a voltage sextupler circuit of FIG. 3 with the addition of the parasitic capacitance $C_{SEXT}$ of the third stage diodes $D_5$ and $D_6$. Once again, in order that the third stage of voltage multiplication gives more voltage than the frequency quadrupler circuit of FIG. 4, the parasitic capacitance $C_{SEXT}$ of the third stage diodes $D_5$ and $D_6$ should be less than the parasitic capacitance $C_{QUAD}$ of the second stage diodes $D_3$ and $D_4$. Preferably, the parasitic capacitance $C_{SEXT}$ of the third stage diodes $D_5$ and $D_6$ should be less than 50% of the parasitic capacitance $C_{QUAD}$ of the second stage diodes $D_3$ and $D_4$.

In conclusion, this disclosure has presented a means of multiplying the AC/RF voltage amplitude of a resonant detector circuit to create a resultant DC voltage. By optimizing the size of the RF diodes in the multiplier circuits and the size of the coupling capacitor between each diode multiplier stage, we can potentially obtain a significant performance improvement over a conventional diode doubler circuit.

The addition of multiple stages of voltage multiplier circuits is anticipated by the inventor, wherein each additional stage has parasitics less than the preceding stage.

While each stage of voltage multiplier discussed herein would raise the DC tag voltage by twice the antenna AC voltage over the preceding stage in absence of tag parasitics and diode voltage drops, the inventors anticipate that the invention would also be useful with other multistage voltage summing and multiplying diode circuits not specifically discussed herein.

Obviously, many modifications and variations of the present invention are possible in light of the above teachings. It is therefore to be understood that, within the scope of the appended claims, the invention may be practiced otherwise than as specifically described.

We claim:

1. An apparatus, comprising;
   a passive radio frequency (RF) transponder (Tag), comprising;
   an antenna for receiving power and signals from an RF field, and for sending signals by backscattering power from the RF field;
   tag electronics connected to the antenna, the tag electronics contained in a single semiconductor chip, the tag electronics for receiving signals from the antenna and for controlling the antenna impedance for sending signals;
   a tag power supply in the single semiconductor chip for receiving RF power from the antenna, the tag power supply used as the sole power supply for the tag electronics; wherein the RF power is rectified in a diode rectifier circuit, and wherein the diode rectifier circuit comprises;
      at least a first diode rectifier stage for producing a DC voltage greater than the AC RF voltage produced in the antenna by the RF field, and;
      at least a second diode rectifier stage for producing a voltage greater than twice the AC RF voltage produced in the antenna by the RF field;
   wherein the parasitic capacitance of the second diode rectifier stage is less than 80% of the parasitic capacitance of the first diode rectifier stage.

2. The apparatus of claim 1, wherein the parasitic capacitance of the second diode rectifier stage is less than 50% of the parasitic capacitance of the first diode rectifier stage.

3. The apparatus of claim 2, wherein the parasitic capacitance of the second diode rectifier stage is less than 30% of the parasitic capacitance of the first diode rectifier stage.

4. The apparatus of claim 1, wherein the second diode rectifier stage contains a coupling capacitor which has a capacitance $C_C$, a parasitic capacitance $C_{PC}$, and an RF impedance $Z_C$, and wherein $Z_C$ is much less than the RF impedance $Z_{QUAD}$ of the diodes of the second diode rectifier stage.

5. The apparatus of claim 1, further comprising at least a third diode rectifier stage wherein the parasitic capacitance of the third diode rectifier stage is less than 50% of the parasitic capacitance of the second diode rectifier stage.

* * * * *